Oct. 19, 1943.   G. SLAYTER   2,332,273
FIBROUS GLASS PRODUCTS
Original Filed Aug. 4, 1938   3 Sheets-Sheet 1
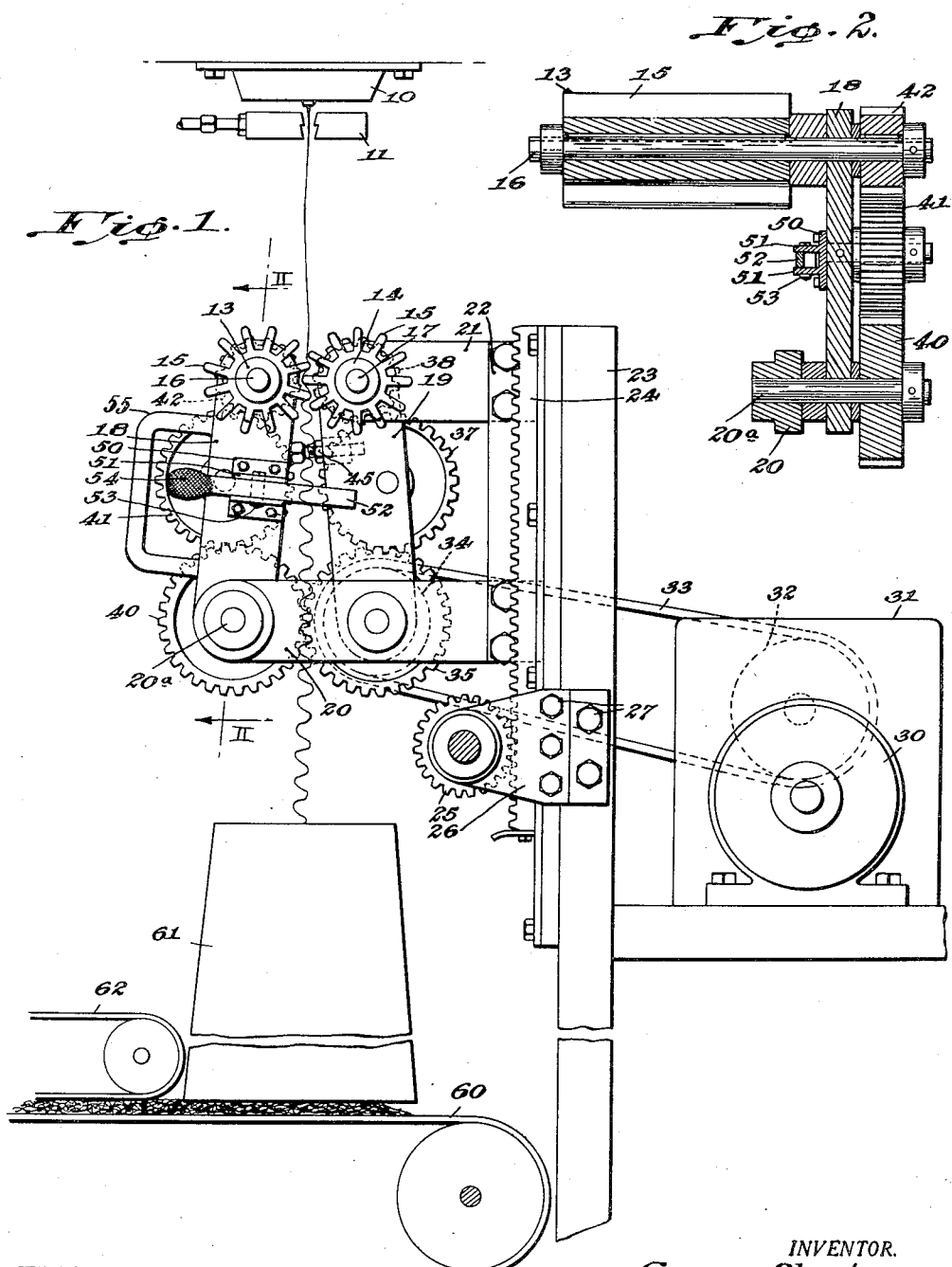
INVENTOR.
Games Slayter,
BY
ATTORNEY Oct. 19, 1943.     G. SLAYTER     2,332,273
FIBROUS GLASS PRODUCTS
Original Filed Aug. 4, 1938     3 Sheets-Sheet 2

INVENTOR.
Games Slayter,
BY
ATTORNEY

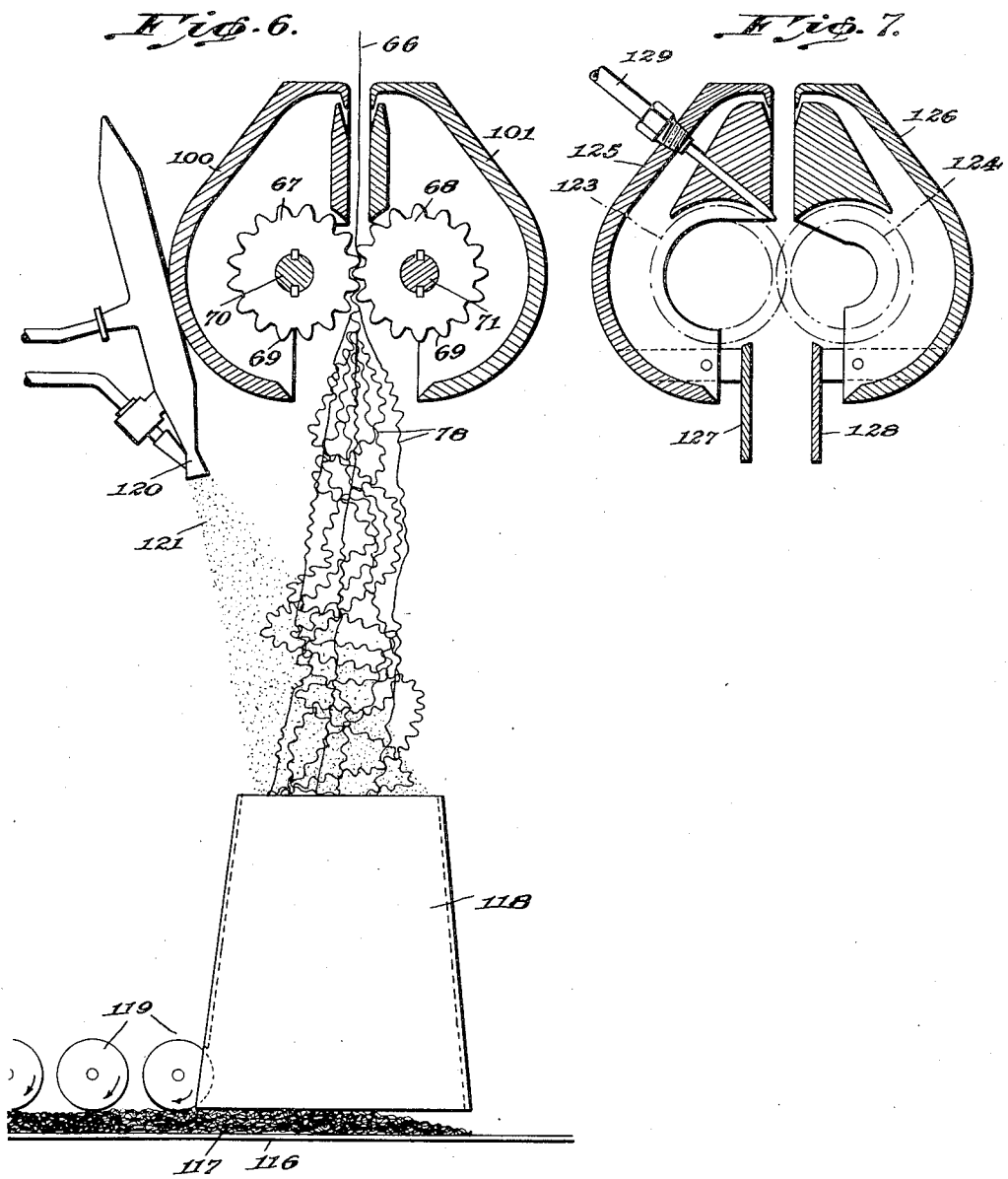

Patented Oct. 19, 1943

2,332,273

UNITED STATES PATENT OFFICE 2,332,273

FIBROUS GLASS PRODUCT

Games Slayter, Newark, Ohio, assignor, by mesne assignments, to Owens-Corning Fiberglas Corporation, a corporation of Delaware Original application August 4, 1938, Serial No. 223,104. Divided and this application August 16, 1940, Serial No. 352,911

6 Claims. (Cl. 154—44)

The present invention relates to mineral fiber products and particularly to crimped or corrugated glass fibers and to tangled or felted mats of crimped fibrous glass.

This application is a division of my copending application, Serial Number 223,104, filed August 4, 1938, now Patent No. 2,230,272, dated February 4, 1941.

Heretofore attempts have been made to produce crimped fibrous glass, but the methods of production were limited to those used ordinarily for mechanically drawing fibrous glass and the glass was crimped as an intermediate step while the glass was in a formative stage. Synchronization between the attenuating means, the crimping rolls and the temperature means had to be made.

The fibrous products made by this mechanical drawing process consisted of layers of fibers lying on top of one another more or less parallel with the major surface of the mat. The corrugated fibers were corrugated in but one plane so that the fiber would lie flat and pile up in that form. There was no entanglement or felting of the glass fibers, nor were there fibers running in directions transverse to the stratifications or layers.

An object of the invention is to produce a fibrous glass product consisting of crimped fibers wherein the glass fibers may be entangled and felted to produce a product having vastly increased resilience in all directions, compressibility, lightness in weight and mass integrity.

Owing to the crimped nature of the fiber, an entanglement or felting is difficult to achieve, for it will be noted that the fibers possess substantial dimensions in more than one direction. It is thus difficult for a crimped fiber to penetrate through small interstices present in the fibrous mass.

Another object of the present invention is to produce fibrous glass which lies in one or more planes; that is, the fiber may be corrugated in but one plane or the fiber may be twisted in addition to lie in a multiplicity of planes and extend in substantially all directions.

Various other objects and advantages of the present invention will become apparent from the following description taken in conjunction with the drawings, in which:

Fig. 1 is an elevational view, shown in part diagrammatically, of an apparatus for producing crimped fibrous glass and forming, if desired, a mat thereof;

Fig. 2 is a cross-sectional view of a portion of the apparatus shown in Fig. 1, the section being taken along the line II—II of Fig. 1;

Figure 3:
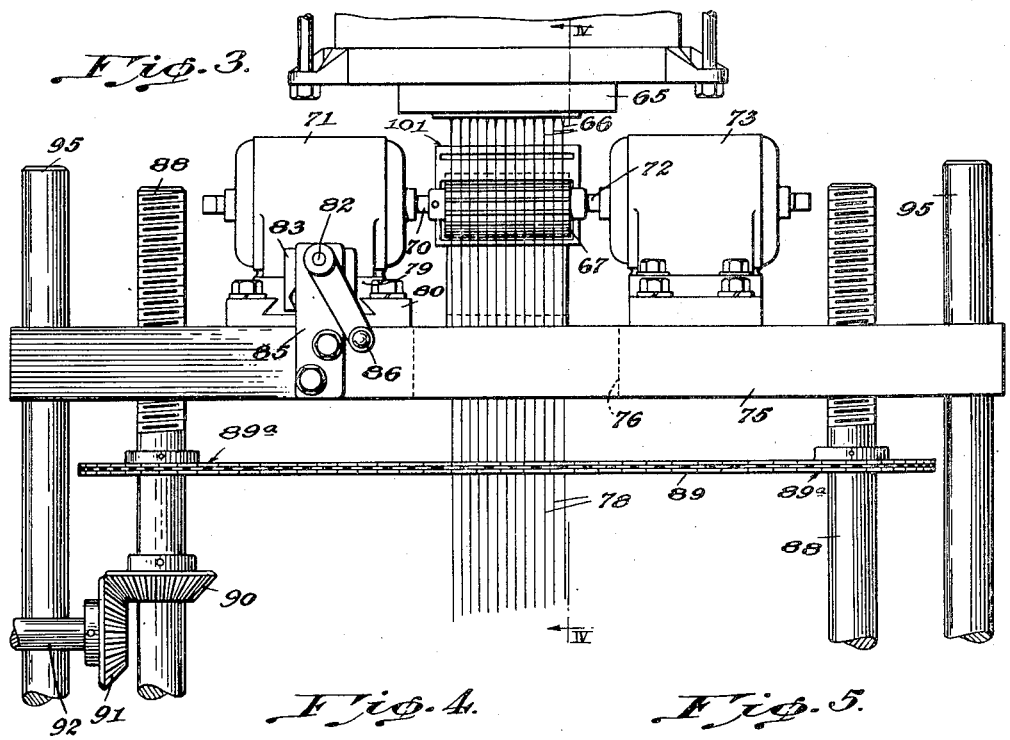
Fig. 3 is an elevational view of a modified embodiment of apparatus adapted to produce crimped fibrous glass.

Fig. 6 is a diagrammatic cross-sectional view which illustrates a modified embodiment of apparatus for producing fibers of the present invention, showing the crimped fibrous glass being thrown out under conditions to cause the glass fibers to entangle with one another and treated with a coating material prior to their deposition in bat forms; and Fig. 7 is an elevational cross-sectional view of another modified embodiment of the present invention, showing means for lubricating the fibrous glass prior to complete attenuation.

The present invention provides crimped or corrugated fibrous glass preferably formed by the simultaneous mechanical attenuation and crimping of a glass stream into wavy fibrous form by means of suitable apparatus such as coacting gear-shaped members. The individual teeth of the respective gears or crimping rolls are made to run interjacent although spaced apart from one another. Clearance is thus provided to permit the glass streams or fibers to pass therethrough without being crushed or squeezed. Sufficient traction may be imparted, however, to the fiber as it passes in zigzag formation, that attenuation may be effected without excessive wear or friction upon the coacting crimping rolls.

After being attenuated, the crimped glass fibers may be fabricated into suitable products as desired. For example, they may be deposited directly upon a belt and built up into mat formation. To facilitate an interfelting, I have discovered that twisting and/or entanglement of the fibers prior to deposition is beneficial, and for this purpose, a temperature control whereby the glass emerging from the crimping rolls is still in a partially plastic or formative stage, is desirable. When the glass is still in a partially plastic stage as it emerges from the rolls, and the fibers are permitted by means of turbulence, or extremely high speeds of formation, to twist and tangle with one another, the fibers after depositing upon the belt, or prior thereto, may be chilled and set in their twisted or tangled formation.

In this connection, the crimped fibers may be deposited upon a conveyor in partially plastic condition, or rendered plastic thereafter, and then worked, compressed or compacted into felted form of predetermined density and dimensions.

Referring now more particularly to Figs. 1 and 2, reference character 10 designates a glass feeder appurtenant to a glass tank or other supply body. The design of this feeder may be as desired, although satisfactory results have been achieved by means of a feeder illustrated and described in the Thomas and Fletcher Patent Number 2,165,318. Located below the feeder 10 may be, if desired, a blower or other cooling apparatus 11 suitable to facilitate attenuation in accordance with the Slayter and Thomas Patent No. 2,234,986. The blower 11, however, may be or may not be used according to the type of stream forming apparatus which is to be used.

Spaced below the feeder 10 and the blower 11, are coacting crimping rolls 13 and 14 gear-shaped in cross-section by being each provided with a series of teeth, or balls 15, around the periphery thereof. The crimping rolls 13 and 14 are keyed to shafts 16 and 17 respectively, which in turn are rotatably mounted upon supports 18 and 19 respectively. The support 18 is pivoted at its lower end upon a cantilever beam 20 by means of a pin 20ª. The support 19 is fixed upon the cantilever beam 20 at its lower end, and is held in fixed position at the upper end by cantilever beam 21. The cantilever beams 20 and 21 may be bolted to a slide member 22, adapted to slide vertically upon a base or framework 23. A rack 24 fixed to the slide member 22 coacts with a spur gear 25 which may be rotated to adjust the rack and appurtenant mechanism in predetermined vertical position. The gear 25 may be borne by a lug 26 secured to the base 23 by means of bolts 27.

The crimping rolls 13 and 14 are actuated by any suitable power mechanism, such as a motor 30, and at synchronous speeds whereby the respective teeth 15 of the crimping rolls intermesh without engaging or touching each other.

A suitable interconnecting mechanism may consist of a gear box 31, a pulley 32, belt 33, and pulley 34, leading to gear trains communicating with the respective crimping rolls. The gear trains are all driven synchronously from the pulley 34 which is fixed to or integral with a gear 35.

The gear 35 drives the crimping roll 14 through intermediate gear 37 and gear 38 which is keyed to the shaft 17 of the crimping roll 14. Intermediate gear 37 may be mounted upon the support 19.

The gear 35 drives the crimping roll 13 through gear 40, intermediate gear 41, and gear 42 which is keyed to the shaft 16 of the crimping roll 13. Intermediate gear 41 is mounted upon the pivoted support 18.

Mechanism for holding the crimping roll 13 at any predetermined distance from the crimping roll 14, includes a set screw 45 located on the inner side of the support 19, and adapted to abut the support 18. The set screw 45 may be adjusted to permit the crimping rolls to come together to any desired degree.

Mounted upon the support 18 is a plate 50 having upstanding flanges 51 between which is a pivoted finger 52, fulcrumed upon pivot 53. The finger 52 at one end is provided with a roughened thumb plate 54 which may be pressed to throw the opposite end of the finger out of alignment with the support 19 and thus enable the crimping rolls to be moved together in operative position. When it is desired to move the crimping roll 13 out of operative position, a handle 55 integral with the support 18 may be pulled out and the finger 52 turned to be in alignment with and abut the support 19. The finger 52 thus holds the crimping roll 13 out of operative position with the crimping roll 14.

Spaced below the crimping rolls 13 and 14 is a bat forming unit consisting of a traveling support or conveyor 60 upon which the crimped fibers descend and deposit themselves in a mat formation. A hood 61 may be provided to direct the fibers upon the conveyor 60. If desired, the fibers may be compressed by means of a caterpillar belt 62 mounted over the mat and conveyor 60 and, if desired, into the mouth of the hood.

In operation of this device the two crimping rolls are driven simultaneously and in complete synchronism with one another from the common driving gear 35. The crimping roll 13 may be pulled into and out of engagement with the crimping roll 14 during operation of the gears and without interrupting their mutual synchronism. This, it will be observed, is done by causing the crimping roll 13 and cooperating driving mechanism which is mounted upon the support 18 to pivot about the pin or shaft 20ª. Pulling the support 18 and the crimping roll 13 into inoperative position does not affect the intermeshing of the gear trains.

The apparatus illustrated and described in Figs. 1 and 2 is ideally suitable for producing crimped fibers of what might be considered a relatively coarse type that is having a diameter in the ordinary ranges of about .001 to .1 inch, this type of fiber being particularly adaptable for air filtration media although obviously suitable also for heat and sound insulation, etc. While high speeds of production may be used, the mechanical difficulties encountered in the use of gear trains, generally limit the speed of attenuation of the fibrous glass below that desirable for highest speed and finest fiber formation. For this purpose, I have designed a high speed apparatus controlled solely by electrical means, reference being made to Figs. 3 and 4.

Figures 4, 5:
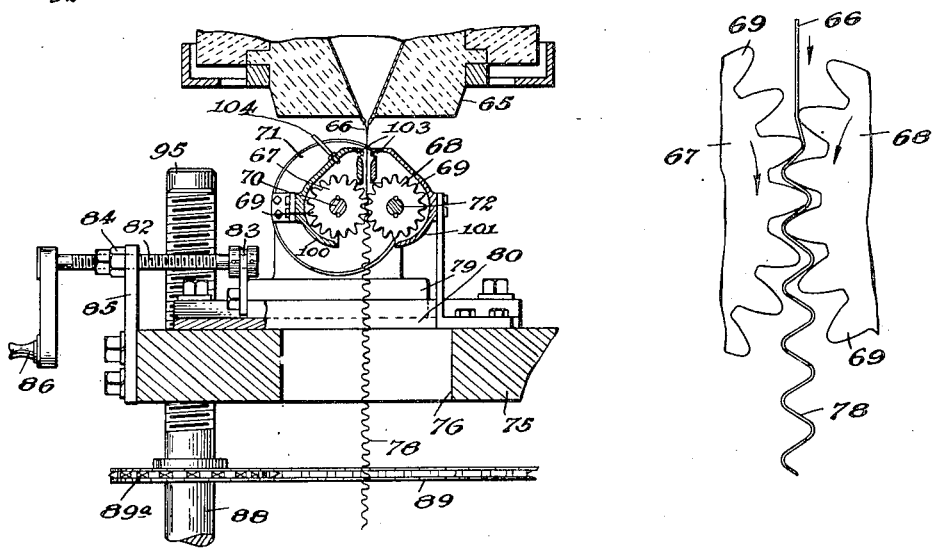
Fig. 4 is a cross-sectional view of the apparatus shown in Fig. 3, this view being taken along the line IV—IV of Fig. 3.
Fig. 5 is a fragmentary elevational view of a stream of glass being attenuated and crimped by means of coacting gear-shaped members.

In Figs. 3 and 4, reference character 65 designates a fiber glass feeder adapted to provide a multiplicity of glass streams 66. Spaced below the feeder 65 are coacting crimping rolls 67 and 68 respectively, each provided with a series of crimping teeth 69 around the periphery thereof adapted to intermesh with one another. The crimping roll 67 is keyed to a motor shaft 70 of a motor 71. The crimping roll 68 is keyed to a similar motor shaft 72 of a motor 73. Motor 73 is bolted to a vertically adjustable base plate 75 having an aperture 76 therein for the passage of the fibers 78 emerging from the crimping rolls.

Motor 71 is mounted upon a horizontal slide 79, sliding in the slide channel 80 which is bolted to the base plate 75. Screw 82 fixed at one end to the slide 79 by means of a lug 83, may coact with an internally threaded member or nut 84, mounted upon the base plate 75 by means of a lug 85. A crank 86 is fixed to the free end of the screw 82, and may be rotated either way in order to move the slide 79 and crimping roll 67 to any desired distance from the crimping roll 68. Vertical movement may be imparted to the base plate 75 by means of vertical screw posts 88 upon which the base plate is mounted. The vertical screw posts 88 are all interconnected with one another by means of a chain 89 and sprockets 89ª to operate synchronously. The screw posts may be driven by any suitable means such as bevel gears 90 and 91 actuated by drive shaft 92 (see Fig. 3). Supplementary guide posts 95, passing through the base plate 75, may be provided to contribute strength and steadiness to the mechanism.

Each of the crimping rolls 67 and 68 may be provided with a housing 100 and 101 respectively. The housings fit around the crimping rolls and communicate at their upper ends with opening 103 on each side of the row of streams 66. As the crimping rolls rotate, the crimping teeth 69 carry air therebetween which is thrown out centrifugally to the top of the housing so that it passes out through the opening 103 where it is directed upon the glass streams 66. The drafts or blasts of air emerging from the openings 103 may induce more air over the top of the opening against the glass as it emerges from the feeder 65.

An oil spray 104 may be provided in either one or both of the housings 100 and 101 to incorporate an oil fog or vapor into the air stream passing through the blower 103. The glass streams 66 and resulting fibers may thus be lubricated by oil or other suitable lubricant prior to physical contact either with other fibers or by the crimping rolls themselves.

The motors 71 and 73 may be of any suitable design, although preferably they are of a synchronous motor type, such as conventional synchronous motors or reluctance motors, and they may be synchro-tied with one another in order to insure absolute synchronism of the crimping rolls during operation irrespective of the speed of attenuation. Extremely high motor speeds are attainable by this type of drive, as for example, about 20,000 or 40,000 R. P. M. or even more. With crimping rolls of about one to two feet circumference, a total attenuating speed of 20,000 to 80,000 or more lineal feet of fiber length per minute may be achieved. The fiber diameter produced by such a mechanism may vary according to requirements, although ordinarily the fiber diameter of a few microns or ten thousandths of an inch to about a thousandth of an inch is suitable for ordinary purposes, such as heat insulating bats, blankets, or the like. Ordinarily, crimped fibers having several times the diameter of straight fibers may be used without increasing physical irritation or affecting deleteriously the feel or flexibility of the product. For this reason, coarser crimped fibers of say .001 inch may more successfully be used for a great many purposes than straight fibers.

If the temperature conditions of the glass streams as they pass through the crimping rolls is sufficiently high so that the glass after emerging from the rolls is above what appears to be the softening point, or at least is still in a formative stage, the fibers are free to twist and bend so that ultimate fibers having portions of their length in substantially all directions may be produced. Such a process is illustrated diagrammatically in Fig. 6. As the fibers twist, the crimps are moved angularly relative to each other about the fibers so that ultimately the fibers have their crimps or corrugations relatively angularly spaced about an axis represented by a line extending lengthwise of the fibers and joining the points of reversal of curvature of adjoining crimps. These fibers 78 produce a novel type of pack in that they tangle themselves in the gaseous atmosphere, a result not attainable when they are merely laid upon one another on a flat surface. In addition, the fibers extending in all directions are partially tangled or prefelted, another condition difficult to achieve by merely laying fibers upon a surface since the fibers having crimps lying in all planes are difficult to penetrate into the interstices between the fibers in the mat.

As shown in Fig. 6 the crimped fibers 78 tangle and twist in the gaseous atmosphere below the crimping device and then deposit themselves freely upon a continuously moving surface or conveyor 116 to form a highly resilient mat 117. A hood 118 may be used to confine the deposition to a predetermined surface upon the conveyor 116. If desired, rolls 119 may be provided to increase the interfelting of the fibers. These rolls may be driven in the direction of the arrows, or may be what is known as idler rolls.

Fig. 6 also illustrates a lubricant or binder applicator 120 adapted to spray a suitable treating material 121 upon the fibers as they descend and deposit themselves upon the belt 116. The binder may be of any suitable composition such as natural or artificial resins, including both the thermoplastic and thermosetting type, glue, asphalt, casein, sodium silicate, starch, plaster of Paris, borax, oil, fatty acids, soluble and/or insoluble soap, rubber, latex, linseed oil, agar agar, oils, fats, clay, bentonite, pitches, gums, or combinations thereof according to the properties desired.

In Fig. 7 a modified embodiment of apparatus is shown comprising crimping rolls 123 and 124 intermeshing with one another, housings 125 and 126 over the crimping rolls respectively, guide skirts 127 and 128 arranged under the crimping rolls respectively to facilitate emission of the crimped fibers, and a lubricant spray gun 129 having its nozzle located directly over the point of intermeshing of the crimping rolls. Such an arrangement of the spray gun 129 permits a lubricant to be applied to the glass fibers prior to and as they enter the crimping rolls to insure minimum friction or scratching of the fibers, and prevent premature wearing of the rolls.

Various modifications and variations may be resorted to within the spirit and scope of the present invention as defined in the appended claims.

I claim:

1. A glass fiber corrugated along the length thereof, the corrugations being alternately reversely curved and relatively angularly spaced about a lengthwise extending line joining the points of reversal of curvature between adjoining corrugations.

2. As an article of manufacture, a mat of crimped glass fibers in which the fibers extend in all directions and are interfelted and tangled to have coherence and resilience in all directions, the crimps of the individual fibers being relatively angularly displaced about a line lengthwise of the fiber and joining the points of reversal of curvature between adjoining crimps, whereby the fibers effectively felt together, and binding material distributed throughout the mat to hold the fibers together in the mat.

3. As an article of manufacture, a mass of crimped glass fibers, the fibers whereof extend in all directions in said mass and are tangled together and interlocked by their crimps to provide coherence of said mass in all directions and resist tearing apart of the mass, the crimps of an individual fiber being alternately reversely curved and relatively angularly displaced about an axis extending in the direction of length of the fiber.

4. A crimped glass fiber having a plurality of closely spaced crimps along its length, said crimps being relatively angularly displaced about an axis extending lengthwise of the fiber.

5. A crimped glass fiber having a plurality of closely spaced crimps along its length, said crimps being alternately reversely curved and relatively angularly displaced about an axis extending lengthwise of the fiber.

6. As an article of manufacture, a mat of corrugated glass fibers in which the fibers extend in all directions and are interfelted and tangled to provide coherence of the mat in all directions, the corrugations of the individual fibers being relatively angularly displaced about an axis extending lengthwise of the fiber.

GAMES SLAYTER.